United States Patent
Li et al.

(10) Patent No.: US 9,193,603 B2
(45) Date of Patent: Nov. 24, 2015

(54) URCHIN-LIKE IRON OXIDE AND A METHOD FOR PRODUCING THE URCHIN-LIKE IRON OXIDE

(71) Applicant: National Chung Cheng University, Chia-Yi (TW)

(72) Inventors: Yuan-Yao Li, Chia-Yi (TW); Hsin-Chih Yu, Zhubei (TW); Li-Chieh Hsu, Taichung (TW)

(73) Assignee: NATIONAL CHUNG CHENG UNIVERSITY, Chia-Yi (TW)

( * ) Notice: Subject to any disclaimer, the term of this patent is extended or adjusted under 35 U.S.C. 154(b) by 335 days.

(21) Appl. No.: 13/712,579

(22) Filed: Dec. 12, 2012

(65) Prior Publication Data

US 2013/0101501 A1    Apr. 25, 2013

Related U.S. Application Data

(62) Division of application No. 13/079,367, filed on Apr. 4, 2011, now abandoned.

(30) Foreign Application Priority Data

Nov. 5, 2010   (TW) ............................... 99138149 A

(51) Int. Cl.
   C01G 49/00     (2006.01)
   C01G 49/02     (2006.01)
   C01G 49/04     (2006.01)
   C01G 49/06     (2006.01)
   C01G 49/08     (2006.01)
   B22F 1/02      (2006.01)

(52) U.S. Cl.
   CPC . *C01G 49/02* (2013.01); *B22F 1/02* (2013.01); *C01G 49/04* (2013.01); *C01G 49/06* (2013.01); *C01G 49/08* (2013.01); *Y10T 428/2982* (2015.01)

(58) Field of Classification Search
   None
   See application file for complete search history.

(56) References Cited

U.S. PATENT DOCUMENTS 5,464,696 A    11/1995  Tournier et al.

FOREIGN PATENT DOCUMENTS

JP    4-144923 A  *  5/1992

OTHER PUBLICATIONS

Tong, et al., "Synthesis and characterization of nanosized . . . absorbing properties" J. of Alloys and Compounds, 509 (2011) 4320-6.*
Du et al., "Ligand-assisted hydrothermal synthesis . . . magnetic properties" J. Phys. Chem. C 2008, 112, 10754-8.*
Ni et al., "Synthesis of core-shell a-Fe2O3 hollow micro-spheres by a simple two-step process" Journal of Alloys and Compounds, 478, 2009, pp. 876-879.*
Tong et al., "Preparation and electrochemical properties of urchin-like $\alpha$-Fe$_2$O$_3$ nanomaterials" *Science China*, Jul. 2010, vol. 53, No. 7 pp. 1897-1903.
Zhang et al., "Controlled synthesis and gas-sensing properties of hollow sea-urchin-like $\alpha$-Fe$_2$O$_3$ nanostructures and $\alpha$-Fe$_2$O$_3$ nanocubes" *Sensors and Actuators B*: Chemical 141 (2009) pp. 381-389.

* cited by examiner

*Primary Examiner* — Steven Bos
(74) *Attorney, Agent, or Firm* — Muncy, Geissler, Olds & Lowe, P.C.

(57) ABSTRACT

The present invention relates to an urchin-like iron oxide and a method for producing the urchin-like iron oxide. The urchin-like iron oxide comprises a core and multiple needle-like elongations protruded from the core. The needle-like elongations could be wire, rod, tube, cone, and flake. The length/width ratio of the needle-like elongation is high enough to apply in an optoelectronic field. The method in accordance with the present invention is to stably heat an iron-contained powder under room temperature by a thermal oxidation. The surface of the iron-contained powder is slow oxidized to form an urchin-like iron oxide with multiple uniform distributed needle-like elongations protruded from the surface. The size of each needle-like elongation is easily adjusted and changed by controlling the heating temperature. The method has advantages of simplified operation and lowered expense.

3 Claims, 7 Drawing Sheets

URCHIN-LIKE IRON OXIDE AND A METHOD FOR PRODUCING THE URCHIN-LIKE IRON OXIDE

CROSS-REFERENCE TO RELATED APPLICATIONS

This application is a Divisional of application Ser. No. 13/079,367, filed on Apr. 4, 2011, for which priority is claimed under 35 U.S.C. §120; and this application claims priority of application Ser. No. 09/913,8149 filed in Taiwan, R.O.C. on Nov. 5, 2010 under 35 U.S.C. §119; the entire contents of all of which are hereby incorporated by reference.

FIELD OF THE INVENTION

The present invention relates to an iron oxide and a method for producing the iron oxide, and more specifically relates to an urchin-like iron oxide and a method for producing the urchin-like iron oxide

BACKGROUND OF THE INVENTION

Iron oxide, such as iron (III) oxide, is a popular material for producing an N-type semiconductor. Iron oxide has features of toxic-free property, light stability, and great shield capability and is widely applied in coating, catalytic, electrochemical and bioengineering fields. However, the electrochemical properties of iron oxide will be significantly affected by the particle size, pore structure and form of an iron oxide particle.

The iron oxide particle might be spheral shaped and a size on a nano or micro scale. Some researchers also try to produce screw or urchin-like shaped iron oxide. Methods for producing specific iron oxides include a hydrothermal synthesis and a template technique. The hydrothermal synthesis uses a metallic oxide to form a metal-surfactant precursor by reacting with a surfactant under a water-free environment. Then the metal-surfactant precursor is acted with an additive and some water so that the surfactant is self-arranged spontaneously and the metallic oxide undergoes a hydrolysis and poly-condensation process to form an urchin-like iron oxide (Du and Cao, 2008). The template technique uses a micro spheral-shaped sulfonate polystyrene as a hard template. The sulfonate polystyrene reacts with an iron-containing solution in a hydrothermal condition to form an urchin-shaped iron oxide. The final step is to remove the template by a sintering process.

The urchin-like iron oxides in accordance with the above mentioned methods are merely urchin-shaped in geometry without uniform needle-arrangement. Otherwise, the process of the hydrothermal synthesis and the template formation of the template technique are highly complex so that the production cost will be increased. The above two methods also have the disadvantage of limiting operation requirements such as specific atmosphere control or solution formulation. Accordingly, it is difficult to precisely control multiple parameters of the iron oxide and to form a standardized urchin-like product.

SUMMARY OF THE INVENTION

The object of the present invention is to provide an inventive urchin-like iron oxide. The urchin-like iron oxide comprises an iron core having a surface and multiple needle-like elongations that are mounted on the surface of the iron core. The iron core is a fine powder and is nano scale in diameter. The needle-like elongation has a high length and width ratio and could be broadly used in the electro-optical engineering and the catalytic fields.

Another object of the present invention is to provide a method for producing an urchin-like iron oxide. The method has advantages of simplified operation and lowered expense. The method in accordance with the present invention is able to stably heat an iron-containing powder under room temperature by a thermal oxidation. The surface of the iron-containing powder is slowly oxidized to form an urchin-like iron oxide with multiple uniformly distributed needle-like elongations protruding from the surface. The size of each needle-like elongation is easily adjusted and changed by controlling the heating temperature. The crystallized feature, length, diameter and appearance of the needle-like elongations of the urchin-like iron oxide are uniform. The ratio of the length and width of the needle-like elongation is higher than is suitable for applying in an optoelectronic field.

The above objects and advantages of the present invention will become more readily apparent to those ordinarily skilled in the art after reviewing the following detailed descriptions and accompanying drawings in which:

BRIEF DESCRIPTIONS OF THE DRAWINGS

DETAILED DESCRIPTION OF THE PREFERRED EMBODIMENT

Figure 1:
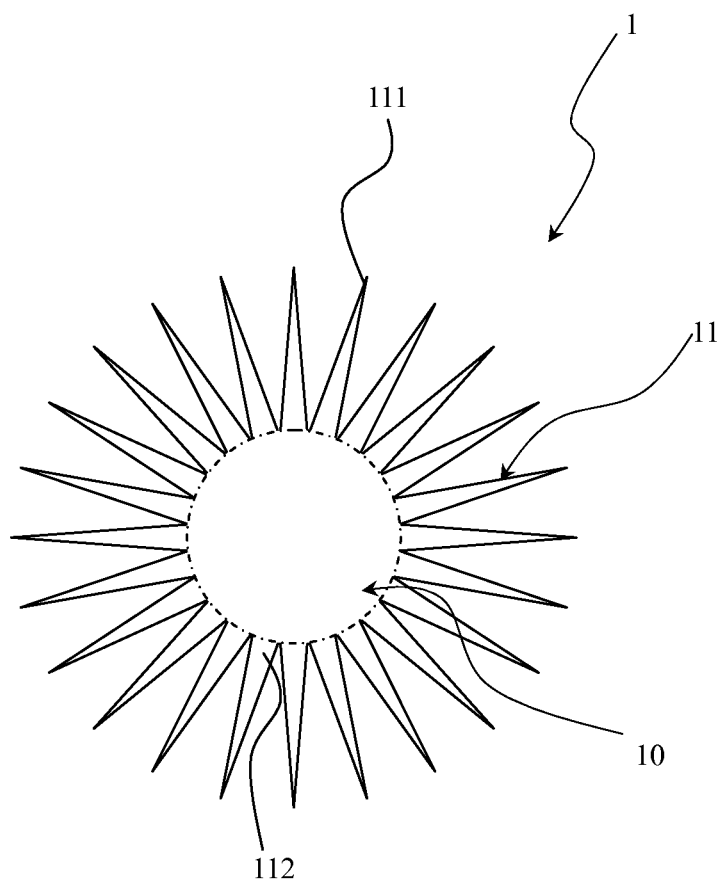
FIG. 1 is structure of an urchin-like iron oxide in accordance with the present invention.

Referring to FIG. 1, an urchin-like iron oxide (1) in accordance with the present invention comprises an iron core (11)

and multiple needle-like elongations (12). The iron core (11) is sphere and has a surface. The needle-like elongations (12) are radically and radiatingly mounted on the surface of the iron core (11). The needle-like elongations (12) could be wire, rod, tube, cone, or flake. Each needle-like elongations (12) has a top portion (111) and a connected portion (112) and has length at least 50 nanometer. The top portion (111) is protruded form the surface and is at least 5 nanometers in diameter. The bottom portion is mounted and conjugated on the surface of the iron core and is at least 10 nanometers in width.

Figure 2:
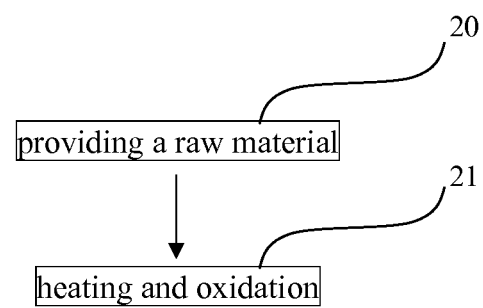
FIG. 2 is a flow chart to show a method for producing an urchin-like iron oxide in accordance with the present invention.
Figure 3A:
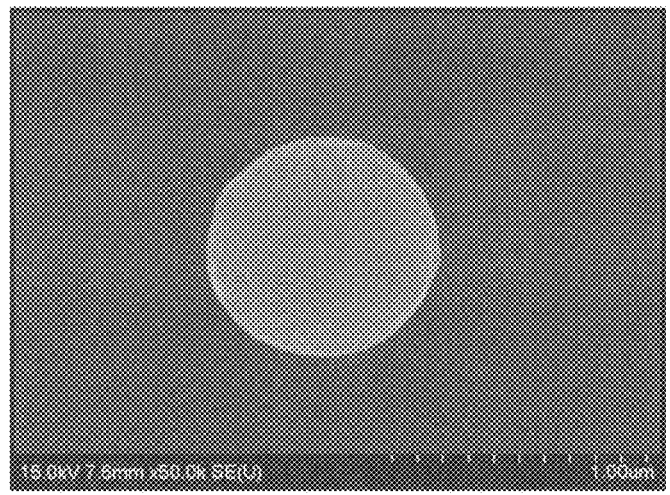
FIG. 3A is a scanning electron microscopy graph of a first embodiment shows appearance of an iron powder that is heated to 300° C.
Figure 3B:
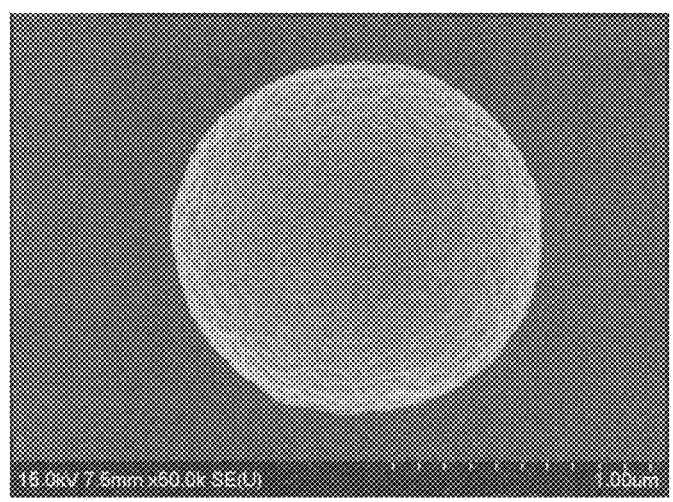
FIG. 3B is a scanning electron microscopy graph of the first embodiment shows appearance of an iron powder that is heated to 300° C. for half hour.
Figure 3C:
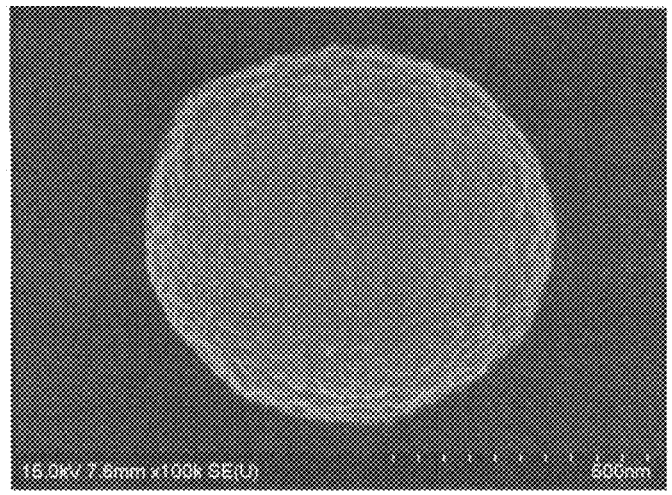
FIG. 3C is a scanning electron microscopy graph of the first embodiment shows appearance of an iron powder that is heated to 300° C. for an hour.
Figure 3D:
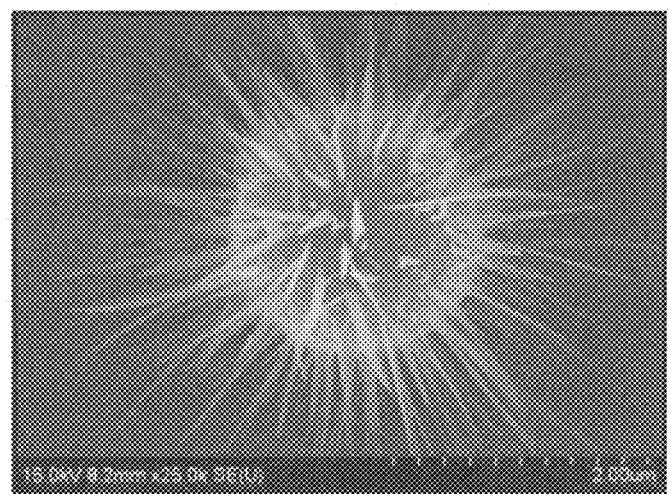
FIG. 3D is a scanning electron microscopy graph of the first embodiment shows appearance of an iron powder that is heated to 300° C. for 10 hours.

With reference to FIG. 2, a method for producing an urchin-like iron oxide in accordance with the present invention comprises steps of:
providing a raw material (20): providing an iron-contained fine powder as the raw material;
heating and oxidizing (21) the raw material: putting the iron-containing fine powder on a plate and heating the iron-containing fine powder to a specific temperature for a period.

In the heating and oxidation (21) step, the raw material is heated from room temperature to at least 220° C. for at least half hour, preferably the heating rate is 1 to 20° C. per minute. In one embodiment, the heating and oxidation (21) step is operated under an atmosphere without applying a specific condition. In another embodiment, the heating and oxidation (21) step is operated under an oxygen concentration of at least 10 mole percentages. In certain embodiments, during said heating and oxidizine, an oxidation rate of an oxide is increased from 0.2 to 1.5 wt % per minute.

Example 1

The example 1 uses an iron powder as the raw material that is heated to 300° C. with the temperature being increased by 5° C. per minute. With reference to FIGS. 3A to 3D, after heated with 300° C. for 30 minutes, the surface of the iron powder begins to oxidize. After 2 hours, the surface of the iron powder is disposed with a layer of oxide and starts to grow multiple tiny protrusions with a top portion 10 to 20 nanometers in diameter. While heating to 10 hours, the protrusions of the surface of the iron powder are extended to form an urchin-like iron oxide particle with multiple needle-like elongations. In the embodiment, the needle-like elongation has a top portion and a connected portion. The length of the needle-like elongation is between 1.8 to 2.2 micrometers. The diameter of the top portion of each needle-like elongation is 20 to 30 nanometers. A ratio of the diameter of the top portion and the length of the needle-like elongation is about 86. Also, in this embodiment, the oxide is increased by 0.26% per minute.

Example 2

Figure 4A:
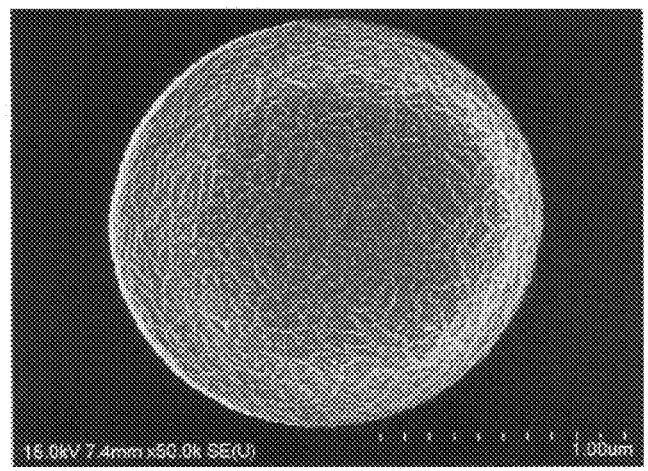
FIG. 4A is a scanning electron microscopy graph of a second embodiment shows appearance of an iron powder that is heated to 350° C.
Figure 4B:
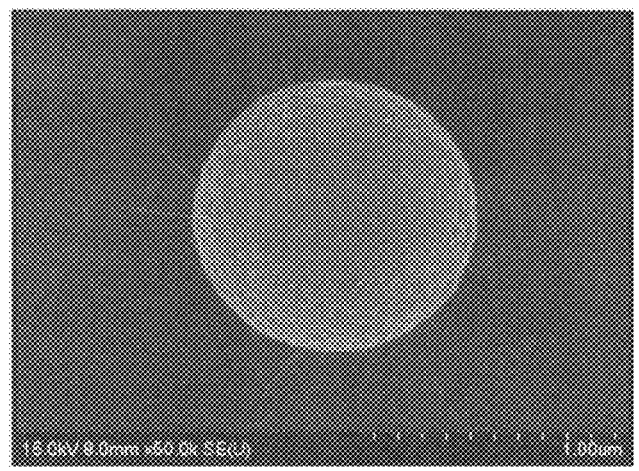
FIG. 4B is a scanning electron microscopy graph of the second embodiment shows appearance of an iron powder that is heated to 350° C. for an hour.
Figure 4C:
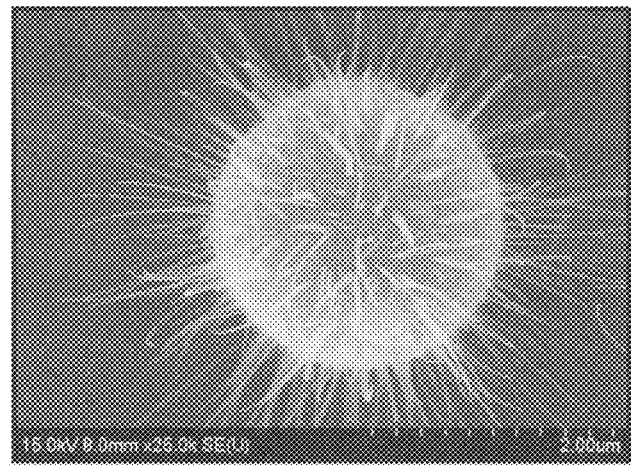
FIG. 4C is a scanning electron microscopy graph of the second embodiment shows appearance of an iron powder that is heated to 350° C. for eight hours.

The example 2 uses an iron powder as the raw material that is heated to 350° C. with the temperature being increased by 5° C. per minute and then keeps heating by 350° C. for a period. With reference to FIGS. 4A to 4C, while starting to heat the iron powder from room temperature for 30 minutes, the surface of the iron powder starts to produce an oxide. After heating for an hour, the surface of the iron powder is disposed by a layer of oxide with multiple tiny needle-like elongations with a top portion 20 to 30 nanometers in diameter. Once heating for 8 hours, the length and the diameter of the top portion of each needle-like elongation is about 1.8 to 2.2 micrometers and 30 to 50 nanometers respectively. Therefore, a ratio of the diameter of the top portion and the length of the needle-like elongation is about 53, and the oxide is increased by 0.26% per minute.

Example 3

Figure 5A:
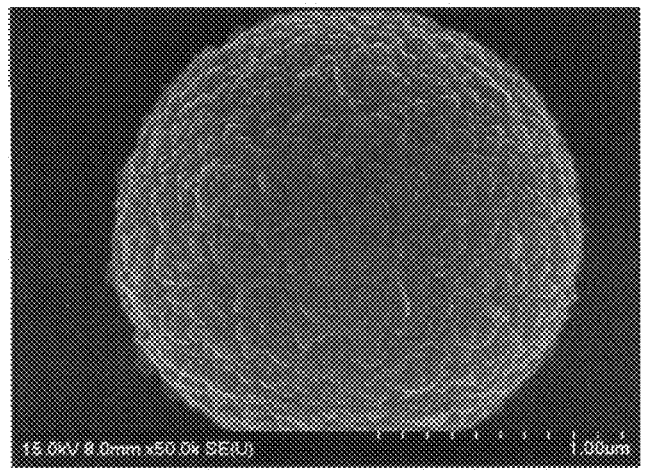
FIG. 5A is a scanning electron microscopy graph of a second embodiment shows appearance of an iron powder that is heated to 400° C.
Figure 5B:
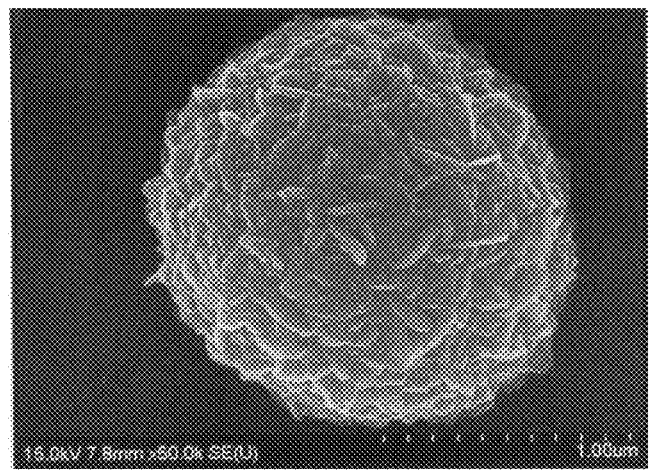
FIG. 5B is a scanning electron microscopy graph of the second embodiment shows appearance of an iron powder that is heated to 400° C. for half hour.
Figure 5C:
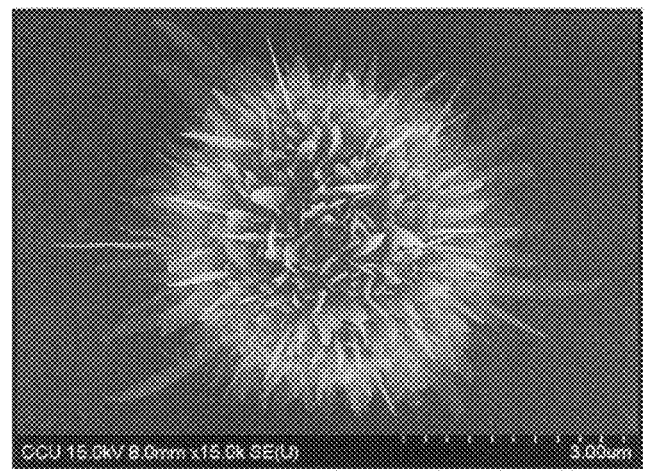
FIG. 5C is a scanning electron microscopy graph of the second embodiment shows appearance of an iron powder that is heated to 400° C. for six hours.

The example 3 also uses an iron powder as the raw material that is heated to 400° C. with the temperature is increased by 5° C. per minute and then keeps heating by 400° C. for a period. With reference to FIGS. 5A to 5C, while starting to heat the iron powder from room temperature for 30 minutes, the surface of the iron powder starts to produce multiple needle-like oxides and each oxide has a top portion 40 to 60 nanometers in diameter. After heating for six hours, the surface of the iron powder is disposed by multiple tiny needle-like elongations and has an urchin-like appearance. In the sample 2, each needle-like elongation is about 1.8 to 2.2 micrometers and 60 to 100 nanometers respectively. Therefore, a ratio of the diameter of the top portion and the length of the needle-like elongation is about 26, and the oxide is increased by 1.24% per minute.

Example 4

Figure 6:
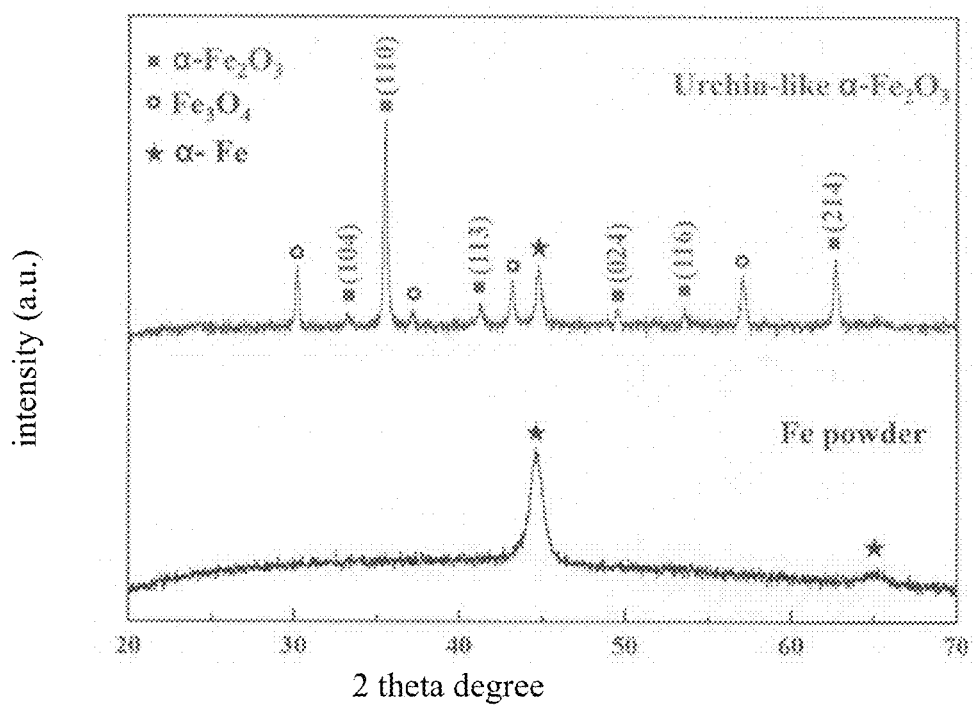
FIG. 6 is an X-ray diffraction diagram of the urchin-like iron oxide in accordance with the present invention.

With reference to FIG. 6, an X-ray diffraction diagram of the urchin-like iron oxide in accordance with the present invention indicates the urchin-like iron oxide comprises alpha-iron(II) oxide, iron(III) oxide and alpha-iron. There are many needle-like elongations disposed on the surface of the iron particle. Therefore, the lattice planes with Miller indices (110) have higher intensity than others. Otherwise, a peak (star symbol) shown at 45 degrees indicates the iron particle does not oxidation completely.

With reference to FIGS. 3A-3D, 4A-4C and 5A-5C, while heating the iron particles with a stable temperature, the surface of the iron particle begins to react with air and produces a lot of iron oxides (such as iron(II) oxide or iron(III) oxide). With the beating period increased, the oxide is delaminated by a different kind of oxide. The outer layered oxide is directly contacted and reacted with air. At a lower heating temperature, the oxidation rate of the outer layered oxide is slower than at a higher heating temperature so that the oxide are tightly arranged on the surface of the iron powder.

Accordingly, the method for producing an urchin-like iron oxide in accordance with the present invention has advantage of easy operation and efficiently decreases the operation expense and procedure. The ratio of the length and width of the needle-like elongation of the urchin-like iron oxide is higher for applying in an optoelectronic field.

What is claimed is:

1. A method for producing an iron oxide comprising:
providing an iron-containing powder;
putting the iron-containing powder on a plate;
heating the iron-containing powder at a stable temperature of at least 220° C. for at least 30 minutes; and
oxidizing a surface of the heated iron-containing powder, wherein the iron-containing powder is heated from room temperature to the stable temperature at a rate of 1 to 20° C. per minute.

2. The method as claimed in claim 1, wherein during said heating and oxidizing, an oxidation rate of an oxide is increased from 0.2 to 1.5 wt % per minute.

3. The method as claimed in claim 2, wherein the steps of heating and oxidizing are conducted under atmospheric conditions or an oxygen concentration of at least 10 mole percent.

* * * * *